United States Patent [19]
Salz et al.

[11] Patent Number: 6,165,093
[45] Date of Patent: Dec. 26, 2000

[54] PULLEY WITH BELT-WIPING SURFACE

[75] Inventors: Maury V. Salz, Davenport, Iowa; John D. Gates, Moline, Ill.

[73] Assignee: Case Corporation, Racine, Wis.

[21] Appl. No.: 09/085,809

[22] Filed: May 27, 1998

[51] Int. Cl.[7] .............................. F16H 7/02; F16H 55/36
[52] U.S. Cl. ........................ 474/167; 474/166; 474/175
[58] Field of Search .......................... 474/92, 164–167, 474/174, 175, 183, 189, 188, 94, 902

[56] References Cited

U.S. PATENT DOCUMENTS

| | | | |
|---|---|---|---|
| 1,847,177 | 3/1932 | Freedlander | 474/167 |
| 2,176,335 | 10/1939 | Gray | 474/167 |
| 2,371,283 | 3/1945 | Collier | 474/175 |
| 3,763,714 | 10/1973 | Kahmann | 474/175 |
| 4,173,155 | 11/1979 | Togami et al. | |
| 4,413,981 | 11/1983 | White et al. | 474/94 |
| 4,810,237 | 3/1989 | Mantovaara | 474/166 |
| 5,334,103 | 8/1994 | Gryspeerdt | 474/18 |
| 5,490,814 | 2/1996 | Whitenight | 474/188 X |

*Primary Examiner*—David A. Bucci
*Assistant Examiner*—Marcus Charles
*Attorney, Agent, or Firm*—Foley & Lardner

[57] ABSTRACT

A pulley plate for use with an opposing pulley plate wherein the plates are configured so as to receive a belt therebetween. The pulley plate includes an inner surface and an outer surface. The inner surface is opposite the outer surface and is adapted for facing the opposing pulley plate. A belt-wiping surface obliquely extends from the inner surface and is located so as to engage the belt. The belt-wiping surface wipes the edges of the belt to increase the friction between the pulley plate and belt and so increase the efficiency of the pulley.

18 Claims, 4 Drawing Sheets

PULLEY WITH BELT-WIPING SURFACE

FIELD OF THE INVENTION

The present invention relates to a variable speed pulley system for transmitting power from one location to another. In particular, the present invention relates to a pulley plate for use with an opposing pulley plate having a belt disposed therebetween. The pulley plate includes a belt-wiping surface or feature obliquely extending from the pulley plate's inner surface and located so as to engage the belt and to remove debris.

BACKGROUND OF THE INVENTION

Variable speed pulley systems are used for transmitting power from one location to another in applications requiring an adjustable drive ratio between a drive shaft and a driven shaft. The pulley systems are typically powered by an engine or other drive mechanism. As conventionally known, variable speed pulley systems may be used to drive a multitude of secondary mechanisms for performing a variety of different functions.

Variable speed pulley systems usually include a drive pulley, a driven pulley, and a belt. The drive pulley generally comprises two pulley plates, one of which is anchored and the other of which is movable with respect to the anchored pulley plate. The belt extends from between these two plates on one end to some distal pivot, which may be another sheave comprising two spaced apart pulley plates and a torque sensing unit for accommodating fluctuating loads. The torque sensing unit, as described in U.S. Pat. No. 4,173,155 issued to Togami et al, reacts to a quick change in the load applied by the belt (for example, in response to a large mat or quantity of material entering a threshing mechanism).

Each pulley plate of the drive and driven pulleys has a face that encompasses a pulley contact surface. The pulley contact surfaces of two pulley plates of either the drive or driven pulley face one another. The pulley contact surfaces are generally angled so that as the distance between the pulley plates is reduced, the belt is forced into contact with the faces of the plates at a greater spacing from the center of the faces. Conversely, as the plates are moved apart, the belt is allowed to contact the faces of the plates at a smaller spacing from the center.

Many of the machines employing a pulley system as a component, such as agricultural and construction equipment, are subject to large amounts of dirt, dust and chaff which fills the air and becomes deposited upon the pulley plates and the belt. This problem is of special concern in harvesting machines such as combines where the harvesting machine itself generates a large volume of chaff during the harvest of crops. The dirt, dust and chaff which become deposited upon the pulley plates reduce the coefficient of friction between the pulley plates and the belt causing the belt to slip and heat up. As a result, the dust, dirt and chaff deposited upon the pulley plates and the belt reduce belt life and reduce power transmission efficiency. Variable speed pulleys and pulleys used in conjunction with torque sensing devices have an additional problem in that the engagement between the pulley plates and the belt occurs over a small surface area. Consequently, even in a clean environment, it is desirable to increase the friction between the plates and the belt in order to achieve greater power through-put values.

Thus, there is a continuing need for a device that removes debris from the belt and increases the friction between the pulley plate and belt of a pulley system without requiring dismantling of the pulley system.

SUMMARY OF THE INVENTION

The present invention is directed to a pulley plate for use with an opposing pulley plate. The two pulley plates are configured so as to receive a belt between them. The pulley plate has an inner surface opposite an outer surface with a belt-wiping surface obliquely extending from the inner surface and located to engage the belt.

According to one aspect of the invention, the belt-wiping surface obliquely extends from the inner surface towards the outer surface of the plate. In another embodiment, the belt-wiping surface is an edge of a continuous groove which is eccentric with respect to the center of the inner surface of the plate. According to various aspects of the invention, the groove is a substantially annular depression in the inner surface of the pulley plate, the groove having a U-shaped cross section. Alternatively, the belt-wiping surface can be configured as the edge of at least one radially extending groove. According to another aspect of the invention, the inner surface includes a plurality of belt-wiping surfaces.

The present invention is also directed to a pulley comprising two inner surfaces, each inner surface opposite an outer surface. The two inner surfaces face each other and are spaced so as to receive a belt therebetween. A belt-wiping surface obliquely extends from the first inner surface and is located to engage the belt.

According to one aspect of the invention, the belt-wiping surface extends from the first inner surface towards the first outer surface. A second aspect of the invention provides a second belt-wiping surface obliquely extending from the second inner surface and also located to engage the belt. Various embodiments of the invention encompass combinations in which one or both of the inner surfaces include belt-wiping surfaces obliquely extending from the inner surface toward the respective outer surface. In addition, aspects of this invention encompass patterns of belt-wiping surfaces that include substantially annular, eccentric obliquely extending surfaces, substantially elliptical obliquely extending surfaces, and radially extending obliquely extending surfaces.

The invention is further directed to a belt drive system including drive and driven pulleys. The drive pulley has first and second inner surfaces, each inner surface opposite its respective outer surface, wherein the two inner surfaces face each other and are spaced to receive a belt therebetween. Similarly, the driven pulley has two inner surfaces opposite respective outer surfaces, wherein the two inner surfaces face one another and are spaced to receive a belt therebetween. In various embodiments of this invention, variations on the number and placement of belt-wiping surfaces in the pulleys are implemented. Therefore, embodiments exist in which only one inner surface of a pulley has a belt-wiping surface, in which both inner surfaces of the pulley have belt-wiping surfaces, and in which mixed combinations of inner surfaces of the drive and driven pulleys include a belt-wiping surface.

Various embodiments also reflect a number of wiper groove patterns contemplated as being particularly effective, although these embodiments are not exclusive. For instance, a substantially annular, eccentric wiper surface placed such that the circumference extends across substantially the entire radius of the inner surface face of the pulley is effective in wiping the belt over the entire speed range of the variable speed pulley system. Similarly, an elliptical groove would achieve the same versatility, as would a groove (or multiple grooves) radially extending across the inner surface of the pulley.

DESCRIPTION OF THE PREFERRED EMBODIMENT

Figure 1:
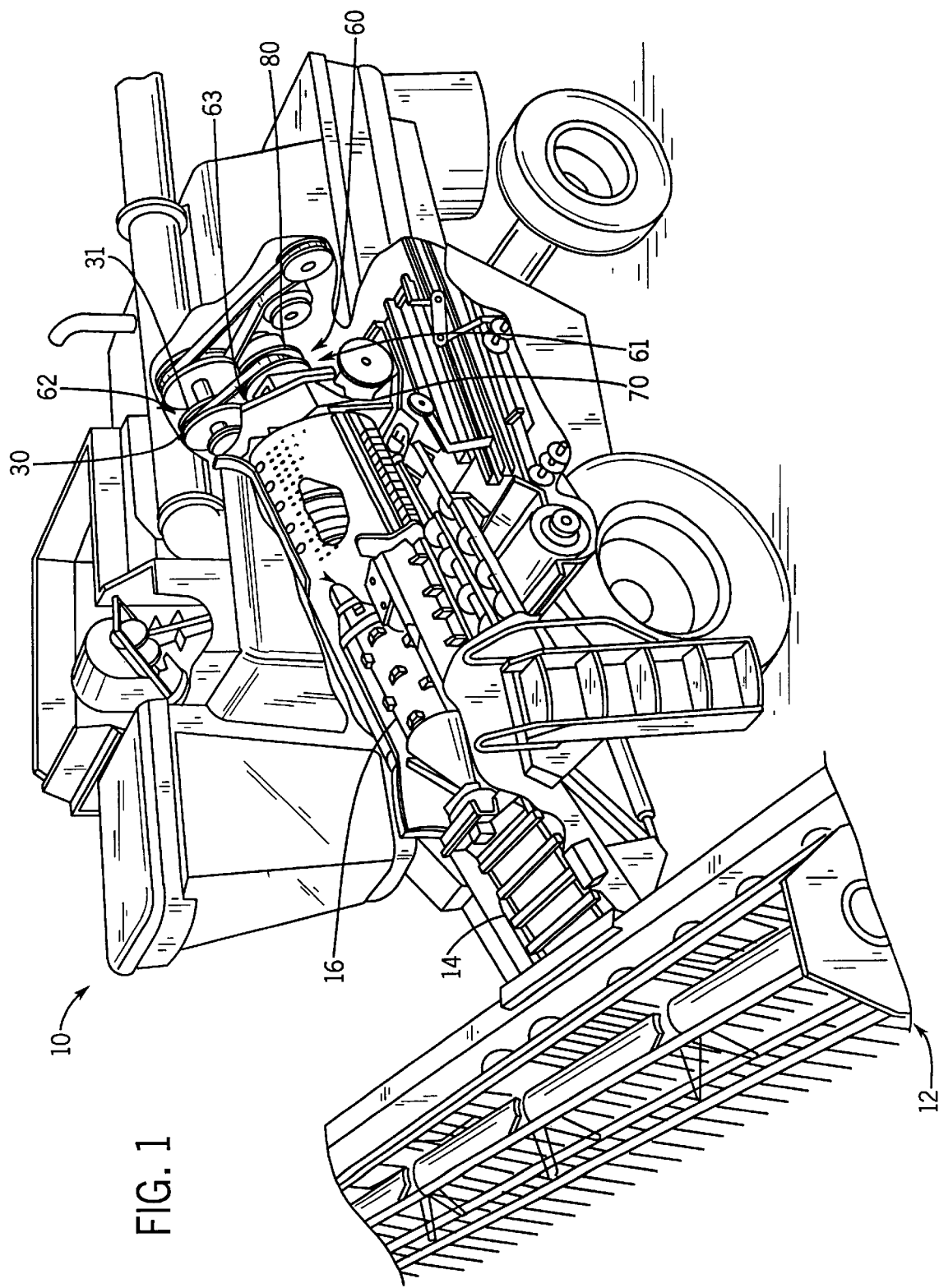
FIG. 1 is a fragmentary perspective view illustrating a harvesting machine including a belt drive system of the present invention.

FIG. 1 is a fragmentary sectional view of a harvesting machine 10 including belt drive system 60. Harvesting machine 10 preferably comprises a conventionally known combine including header 12 and threshing mechanism 16. Header 12 is adapted to harvest crops and feed the crops via feeder 14 into threshing mechanism 16. Threshing mechanism 16 separates the grain or seeds from the remaining straw and chaff. Threshing mechanism 16 is driven by belt drive system 60. Belt drive system 60 includes drive pulley 62, driven pulley 61 and belt 63 extending therebetween.

Drive pulley 62 is preferably a variable speed pulley comprising two spaced apart pulley plates 30, 31 and belt 63 disposed therebetween. Preferably pulley plate 30 is anchored and pulley plate 31 is axially displaceable with respect to pulley plate 30 (by a conventional mechanism not shown). In one embodiment, belt-wiping surfaces (shown, for example, in FIGS. 2–5 and described in relation to pulley plates 70, 80) are provided on the inner surfaces of both pulley plates 30, 31. However, belt-wiping surfaces may be provided only on the inner surface of one of the pulley plates. Drive pulley 62 is connected via a drive shaft (not shown) to a motor or engine (not shown). The motor rotates the drive shaft, which in turn rotates drive pulley 62. As drive pulley 62 rotates, it frictionally engages belt 63 such that belt 63 moves along its length.

Driven pulley 61 generally comprises anchored pulley plate 70 and axially displaceable pulley plate. Pulley plates 70, 80 include opposing inner surfaces 72, 82 spaced so as to receive belt 63 (shown more clearly in FIGS. 2 and 3). Inner surfaces 72, 82 frictionally engage belt 63 such that, as belt 63 moves as described above, pulley plates 70, 80 rotate. Pulley plates 70, 80 are drivingly mounted to threshing mechanism 16 via driven shaft 92 such that as pulley plates 70, 80 rotate, driven shaft 92 rotates and threshing mechanism 16 rotates. Thus, belt 63 transmits the rotational force applied to drive pulley 62 by a motor to each of pulley plates 70, 80. Pulley plates 70, 80 preferably include belt-wiping surfaces 701, 801 (shown in FIGS. 2–5) extending from inner surfaces 72, 82. Alternatively, only one pulley plate includes a belt-wiping surface. Belt-wiping surfaces 701, 801 scrape edges 64 of belt 63 to improve the frictional engagement between belt 63 and pulley plates 70, 80.

Figure 2:
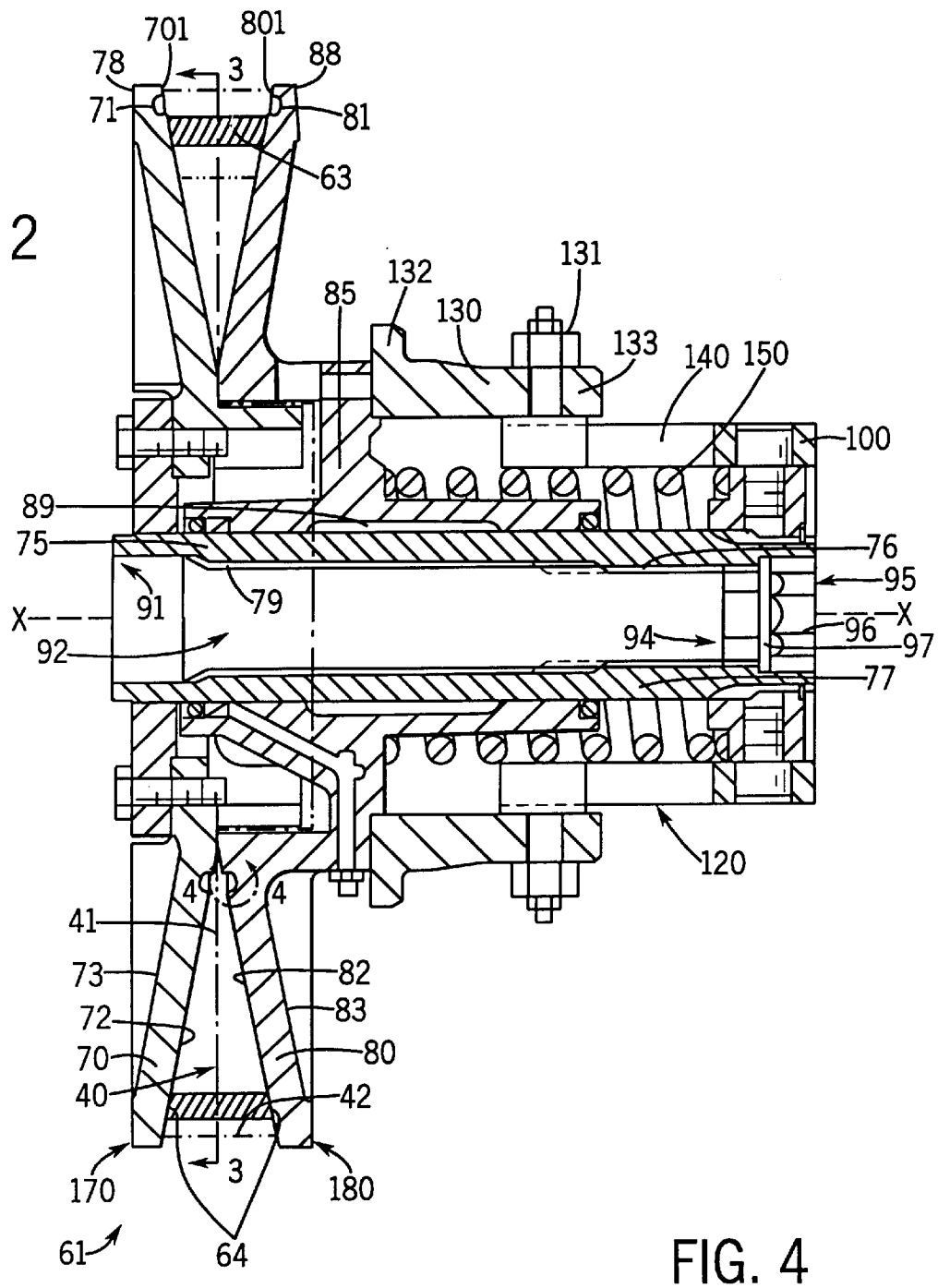
FIG. 2 is a sectional view of the pulley of the belt drive system of FIG. 1.

FIG. 2 is a sectional view illustrating driven pulley 61 of belt drive system 60 in greater detail. Driven pulley 61 comprises torque sensing unit 120, driven shaft 92, belt receiving space 40, belt 63, anchored pulley plate assembly 170, axially displaceable pulley plate assembly 180 and belt-wiping surfaces 701, 801.

Torque sensing unit 120 will be discussed briefly, but is addressed in more detail in U.S. Pat. No. 4,173,155 issued to Togami et al, the full disclosure of which is hereby incorporated by reference. Torque sensing unit 120 comprises cam hub 100, biasing spring 150, cam follower hub 130, cam followers 131 and cam sleeve 140. Torque sensing unit 120 generally has two functions: to bias pulley plate 80 toward anchored pulley plate 70, and to transmit the rotation of pulley plate 80 to driven shaft 92. Torque sensing unit 120 generally applies a constant biasing force through spring 150 and a variable biasing force, as a function of the resistance applied by belt 63, through cam follower hub 130 and followers 131 to pulley plate 80. Thus, unit 120 promotes tension against belt 63 and frictional engagement between plates 70, 80 and belt 63. In addition, torque sensing unit 120 transmits the rotation of pulley plate 80 to driven shaft 92 through cam sleeve 140 and hub 100.

Cam hub 100 is generally tubular and receives distal end 94 of driven shaft 92. Cam hub 100 is non-rotatably connected to cam sleeve 140. Cam hub 100 is drivingly mounted to driven shaft engaging hub 75 of pulley plate assembly 170 with a spline connection (not shown). Cam hub 100 compresses biasing spring 150 against pulley plate 80. Cam hub 100 also works in cooperation with follower hub 130, followers 131, and sleeve 140 to transmit the rotation of pulley plate 80 to driven shaft 92 as will be described hereinafter. Specifically, through the connection to cam sleeve 140, cam hub 100 receives rotation, and through the spline connection to driven shaft engaging hub 75, transmits rotation to pulley plate assembly 170.

Biasing spring 150 is a spring disposed between pulley plate 80 and cam hub 100 and around driven shaft 92. Spring 150 is compressed between hub 100 and pulley plate 80 so that spring 150 applies a constant biasing force on pulley plate 80, forcing pulley plate 80 toward pulley plate 70.

Cam follower hub 130 is generally tubular and includes proximal end 132 and distal end 133. Follower hub 130 is secured to pulley plate 80 at proximal end 132 and receives cam followers 131 at distal end 133. Follower hub 130 initially responds to an increase in the load applied to pulley 61 through belt 63 by moving away from pulley plate 70. Torque sensing cam followers 131, in a conventionally known manner as described in Togami, U.S. Pat. No. 4,173,155, push follower hub 130 back toward pulley plate 70 thereby increasing the biasing force against pulley plate 80. The increase in the applied biasing force pushes pulley plate 80 toward pulley plate 70 such that belt 63 engages pulley 61 adjacent edges 78, 86 of pulley plates 70, 80. Conversely, as the load decreases, follower hub 130 relaxes the biasing force applied against pulley plate 80.

Torque sensing cam followers 131 are conventionally known bearings extending from follower hub 130 radially inwardly to recesses (not shown) in cam sleeve 140. Followers 131 engage the recesses as follower hub 130 rotates, thus rotating sleeve 140. In addition, as follower hub 130 moves axially, followers 131 move axially within the recesses. The functioning of followers 131 is described in U.S. Pat. No. 4,173,155 and is not shown here in detail.

Cam sleeve 140 is generally tubular with recesses at end 141 for receiving followers 131. Sleeve 140 is connected to hub 100 opposite end 141. Through this connection sleeve 140 transmits rotation (applied to sleeve 149 via followers 131 as described previously) to hub 100. Thus, rotation of pulley plate 80 is transmitted to driven shaft 92 by torque sensing unit 120 in the following manner: Pulley plate 80 rotates and transmits the rotation to follower hub 130 via the connection at proximal end 132; follower hub 130 transmits rotation to sleeve 140 through the interference between the recesses in sleeve 140 and followers 131; sleeve 140 is connected to hub 100 and therefore transmits rotation to hub 100; hub 100 transmits rotation to pulley plate assembly 170 through the spline connection (described above); finally, pulley plate assembly 170 transmits rotation to driven shaft 92 through the spline connection between pulley plate assembly 170 and driven shaft 92 (described below).

Driven shaft 92 comprises proximal end 91, distal end 94, and attaching means 95. Driven shaft 92 is conventionally known for drivingly attaching driven pulley 61 to threshing mechanism 16 (or any other device to be driven). Driven shaft 92 is received within driven shaft receiving hub 75 of pulley plate assembly 170. Distal end 94 is textured so as to effect a spline connection between driven shaft 92 and pulley plate assembly 170 such that rotation of pulley plate 70 is transmitted to driven shaft 92. Attaching means 95 includes bolt 96 and washer 97 fitting over distal end 94. The spline connection and attaching means 95 work in conjunction to prevent axial movement of pulley plate assembly 170 with respect to driven shaft 92.

Belt receiving space 40 is defined by inner surfaces 72, 82 of pulley plates 70, 80. Belt receiving space is preferably narrower at proximal end 41 and wider at distal end 42 because inner surfaces 72, 82 are angled (described hereinafter). The width of belt receiving space varies as pulley plate 80 moves with respect to pulley plate 70. Belt receiving space 40 reaches a minimum width when pulley plate 80 is minimally displaced from pulley plate 70. Conversely, belt receiving space 40 reaches a maximum width when pulley plate 80 is maximally displaced from pulley plate 70. When an increased load is applied to driven shaft 92 and slippage of belt 63 results, the width of belt receiving space 40 is decreased (by forcing pulley plate 80 toward pulley plate 70 as has been described in relation to torque sensing unit 120) and the effective diameter of pulley 61 is increased to overcome the increase in load and to prevent belt slippage.

Belt 63 is disposed such that it extends from drive pulley 62 to driven pulley 61. At driven pulley 61, belt 63 is disposed between anchored pulley plate 70 and axially displaceable pulley plate 80 in belt receiving space 40. As pulley 62 is rotated by an engine or motor (not shown), pulley 62 frictionally engages belt 63 such that belt 63 moves along its length, traveling on a path defined by the circumference of belt 63. As belt 63 moves, belt edges 64 engage pulley plates 70, 80 on inner surfaces 72, 82. The friction between belt edges 64 and inner surfaces 72, 82 transmits the rotational force applied to drive pulley 62 to driven pulley 61 such that pulley plates 70, 80 rotate about axis X—X. Pulley plates 70, 80 transmit this rotational force to driven shaft 92, as described above.

Pulley plate assembly 170 includes driven shaft engaging hub 75 and pulley plate 70. Pulley plate assembly 170 engages belt 63 with pulley plate 70 and transmits the received rotation from belt 63 to driven shaft 92 through hub 75.

Driven shaft engaging hub 75 extends from inner surface 72 thereby defining aperture 79, and receives driven shaft 92 therein. Inner wall 76 of hub 75 is textured at distal end 77 to act with textured distal end 94 of driven shaft 92. The resulting spline connection directly transmits rotation of pulley plate 70 to driven shaft 92. Alternatively, any means of drivingly fastening anchored pulley plate 70 to driven shaft 92 may be substituted.

Pulley plate 70 is generally disc shaped and includes outer edge 78, inner surface 72, outer surface 73 and groove 71. Inner surface 72 extends opposite outer surface 73 and provides a face for engaging belt 63. Inner surface 72 is preferably angled for varying the width of belt receiving space 40 to respond to the varying applied load (described previously).

Groove 71 is located in inner surface 72 and preferably extends substantially from aperture 79 to outer edge 78. Groove 71 defines belt-wiping surface 701 from inner surface 72 toward outer surface 73.

Similar to anchored pulley plate assembly 170, axially displaceable pulley plate assembly 180 includes pulley plate 80 connected to tubular hub 85. Pulley plate assembly 180 engages belt 63 with pulley plate 80, and tubular hub 85 slidably engages driven shaft engaging hub 75 of pulley plate assembly 170. Tubular hub 85 extends from outer surface 83, thereby defining aperture 89, and is concentrically mounted about hub 75 of pulley plate assembly 170.

Pulley plate 80 is generally disc shaped and includes outer edge 88, inner surface 82, outer surface 83 and groove 81. Inner surface 82 extends opposite outer surface 83 and provides a face for engaging belt 63. Inner surface 82 is preferably angled such that the width of belt receiving space 40 can be varied (as described previously). Inner surface 82 preferably faces inner surface 72 to define belt receiving space 40 therebetween.

Groove 81 is located in inner surface 82 and preferably extends substantially from aperture 79 to outer edge 88. Groove 81 defines belt-wiping surface 801 from inner surface 82 toward outer surface 83.

FIGS. 2–5 illustrate belt-wiping surfaces 701, 801 of pulley plates 70, 80. Belt-wiping surfaces 701, 801, obliquely extend from inner surfaces 72, 82 of pulley plates 70, 80. In the preferred embodiment shown in FIG. 2, belt-wiping surfaces 701, 801 obliquely extend from inner surfaces 72, 82 towards outer surfaces 73, 83 forming grooves 71, 81 in inner surface 72, 82 (shown in detail in FIG. 4). In the optimal embodiment, belt-wiping surfaces 701, 801 extend perpendicularly from inner surfaces 72, 82 toward outer surfaces 73, 83 respectively. Belt-wiping surfaces 701, 801 may extend at any angle from inner surfaces 72, 82 toward the outer surfaces 73, 83 that permits belt-wiping surfaces 701, 801 to engage and wipe belt edges 64. Belt-wiping surfaces 701, 801 wipe edges 64 of belt 63 to remove impurities, thereby increasing the friction between belt 63 and pulley plates 70, 80 respectively. Increased friction translates into increased through-put values for power transmission. As belt 63 moves, edges 64 engage belt-wiping surfaces 701, 801 of grooves 71, 81 to wipe belt edges 64. Belt edges 64 are effectively scraped by their engagement with belt-wiping surfaces 701, 801.

Figure 4:
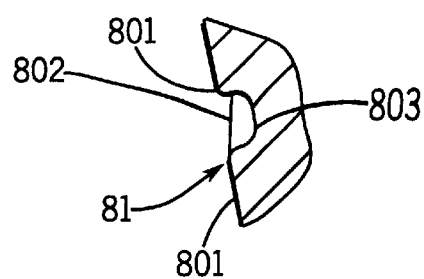
FIG. 4 is an enlarged fragmentary sectional view of the pulley of FIG. 2 taken along line 4—4.

As shown by FIG. 4, the basic components of groove 81 (although belt-wiping surface 801 is shown, belt-wiping surface 701 is similar) include belt-wiping surfaces 801, recess 802, and bottom 803. Although the cross-section of groove 81 is shown as U-shaped, various other shapes may be used to form belt-wiping surfaces 801 such as V-shaped or square. The depth of groove 81 is shown in FIG. 4 as approximately 2.0 mm, however the depth of the groove may be varied. Alternatively, belt-wiping surfaces 701, 801 can extend obliquely from inner surface 72, 82 away from outer surface 73, 83.

Figure 3:
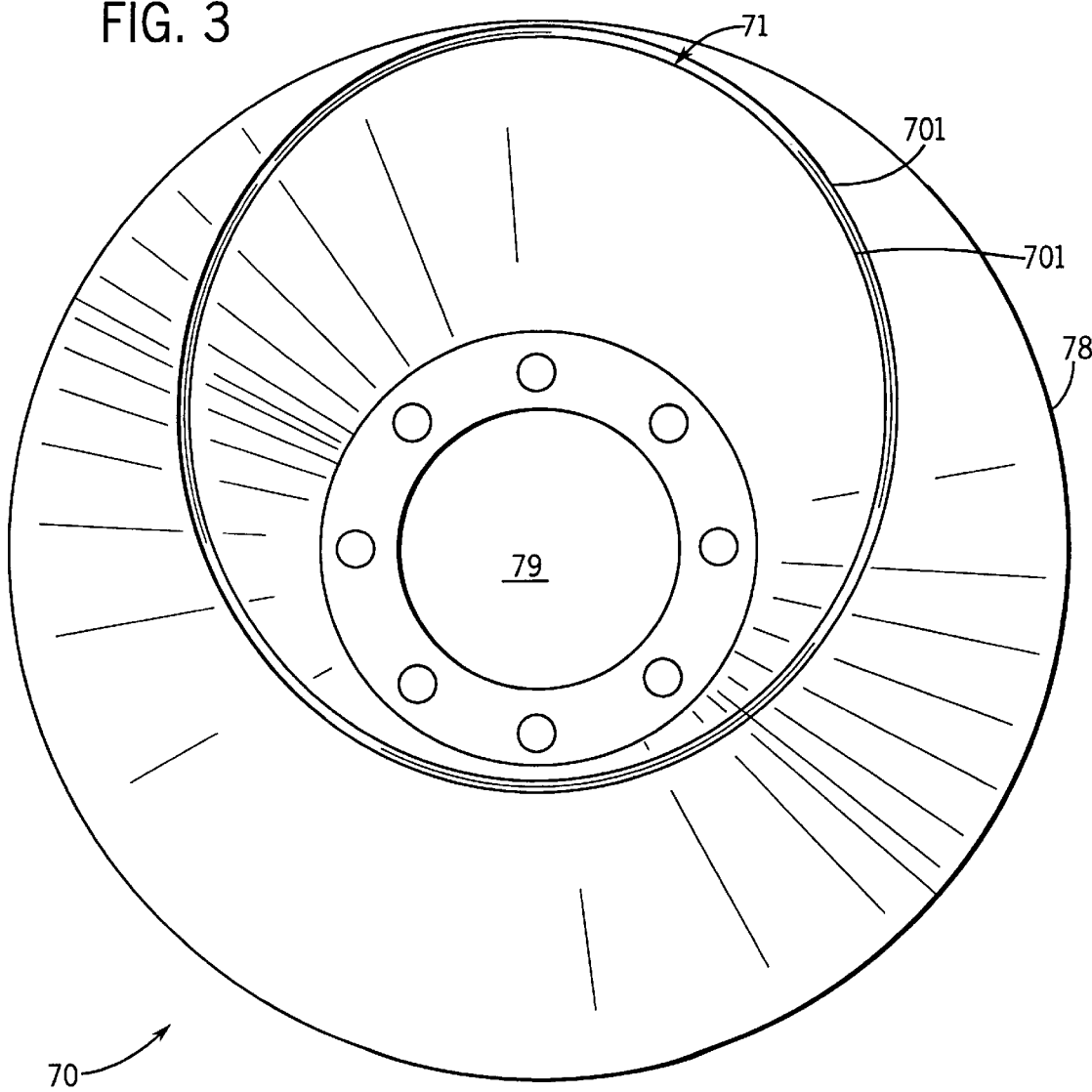
FIG. 3 is an elevational view of a first pulley plate of the pulley of FIG. 3 taken along line 3—3.

FIG. 3 is an elevational view taken along line 3—3 illustrating plate 70 in greater detail. As best shown by FIG. 3, belt-wiping surfaces 701 are the edges of a continuous generally annular groove 71, eccentric with respect to the center of pulley plate 70. A portion of wiping surfaces 701 extend substantially the entire length of the radius of pulley plate 70 so that the wiping action occurs over the full range of loads pulley 61. Therefore, whether the belt engages plate 70 close to aperture 79 or close to circumferential edge 78, belt 63 still engages belt-wiping surfaces 701. Wiping surfaces 701 could, in the alternative, be the edges to a substantially elliptical groove. Furthermore, wiping surfaces 701 could be configured as the edges of a radially extending groove. In addition, pulley plate 70 can include a plurality of belt-wiping surfaces 701. This is not meant to be an exhaustive list of patterns for belt-wiping surface 701. Any surface arranged such that belt 63 engages the surface over a substantial portion of the range of loads and speeds of the torque sensing pulley is acceptable. It is desirable to provide the wiping action over substantially the full range of possible loads and speeds so that belt 63 is being constantly wiped.

Figure 5:
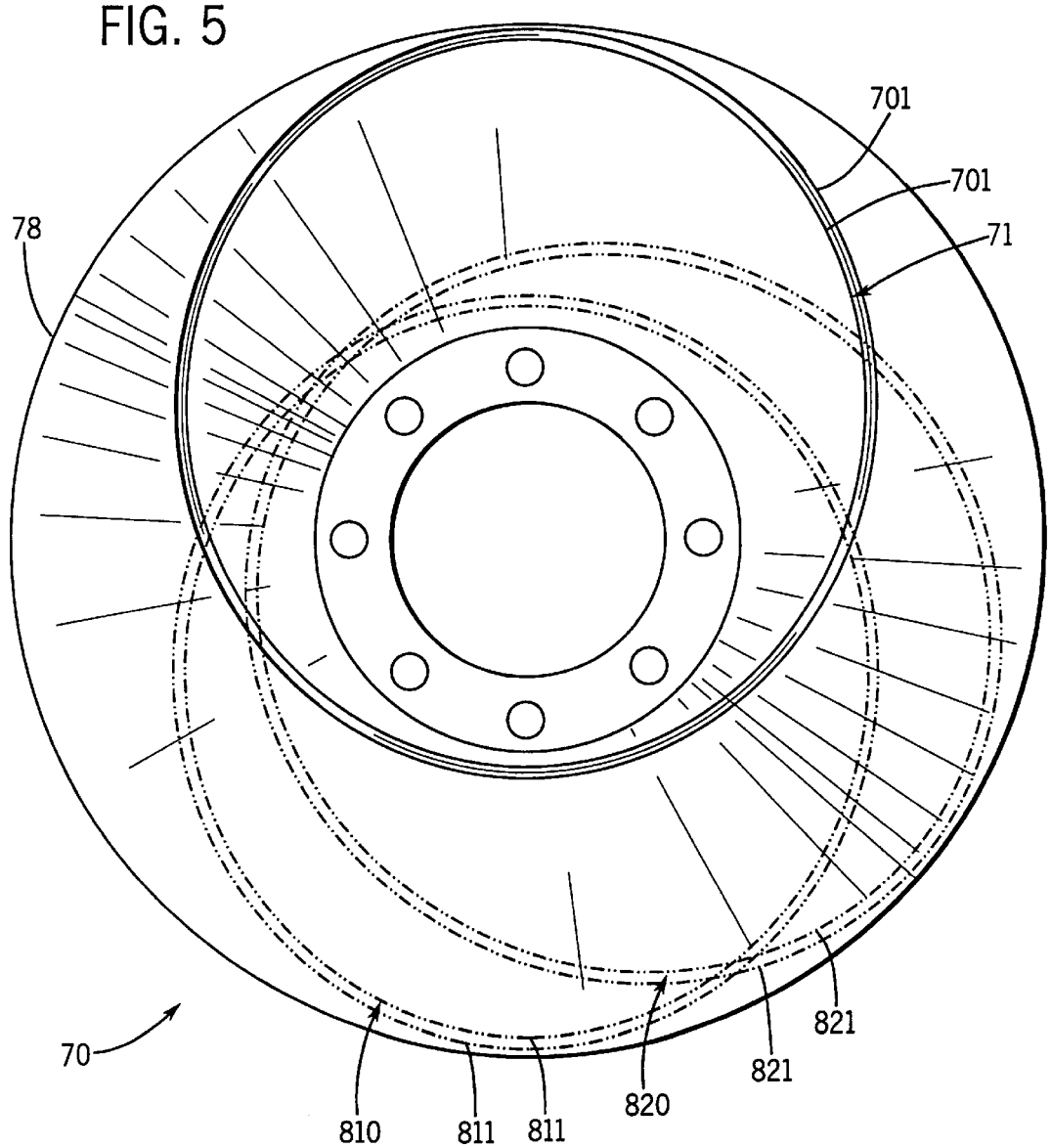
FIG. 5 is an elevational view of a second opposing pulley plate of the pulley of FIG. 2 further illustrating two alternative groove orientations in phantom.

FIG. 5 is an elevational view of a second opposing pulley plate 70 of variable speed pulley 61. FIG. 5 depicts pulley plate 70 and includes, in phantom, alternative grooves 810, 820 defining alternative belt wiping surfaces 811, 821. Grooves 810, 820 and surfaces 811, 821 are identical to groove 81 and surface 801 except that grooves 810, 820 and surfaces 811, 821 eccentrically extend about axis X—X. As will be appreciated, grooves 810, 820 and surfaces 811, 821 might have various other orientations on plate 80.

The pulley plate with belt wiping surface substantially improves the power transmission effected by a torque sensitive pulley. A pulley incorporating the pulley plate with belt wiping surface, as described above and in all its embodiments, is self-cleaning and therefore improves the frictional engagement between the belt and the pulley plate. Thus, a pulley plate with a belt wiping surface increases the efficiency above that of a pulley without a belt wiping surface in its pulley plates.

The description above illustrates the use of the pulley plate with wiper groove in a harvesting machine. The pulley plate is also useful in construction and snowmobile equipment or equipment used in an environment where impurities are likely to be deposited on the pulley plate or belt because the belt wiping surface cleans the impurities off of the belt. The belt-wiping surface increases the friction between the pulley plates and belt and thus is equally important in variable speed pulleys, even in clean environments, because the surface area of engagement between the belt and the pulley plates is small and the frictional engagement between the two is therefore vital to the efficiency of the pulley.

Although the present invention has been described with reference to preferred embodiments, workers skilled in the art will recognize that changes may be made in form and detail without departing from the spirit and scope of the invention.

What is claimed is:

1. A pulley plate for use with an opposing pulley plate, wherein the plates receive a belt therebetween, the pulley plate comprising:
   an outer surface;
   an inner surface opposite the outer surface and adapted for facing the opposing pulley plate, the inner surface having a first center about which the pulley plate is adapted to rotate; and
   a groove extending into the inner surface and continuously extending about a second center offset from the first center, at least one edge of the groove being located so as to engage the belt.

2. The pulley plate of claim 1 wherein the groove is eccentric with respect to the center.

3. The pulley plate of claim 1 wherein the inner surface has an outer periphery and wherein a portion of the groove extends substantially from the first center to the outer periphery.

4. A pulley for use with a belt, the pulley comprising:
   a first inner surface opposite a first outer surface, the first inner surface having a first center about which the pulley is adapted to rotate;
   a second inner surface opposite a second outer surface, the second inner surface facing the first inner surface, wherein the first and second inner surfaces are spaced to receive the belt; and
   a first groove extending into the first surface, the first groove continuously extending about a second center offset from the first center, at least one edge of the first groove being located so as to engage the belt.

5. The pulley of claim 4 including a second groove extending into the second inner surface, wherein at least one edge of the second groove is located so as to engage the belt.

6. The pulley of claim 4 including a second groove extending into the first inner surface and spaced about a third center offset from the first center, at least one edge of the second groove being adapted to engage the belt.

7. The pulley of claim 6 wherein at least one of the first groove and the second groove is arranged to extend substantially from the center to the outer periphery.

8. The pulley of claim 4 wherein the first groove eccentrically extends about the first center.

9. The pulley of claim 4 including a second groove extending into the second inner surface, wherein the second groove extends about a third center offset from the first center, and has at least one edge adapted to engage the belt.

10. A belt drive system comprising:
    a drive pulley including:
      a first inner surface opposite a first outer surface;
      a second inner surface opposite a second outer surface, the second inner surface facing the first inner surface, wherein the first and second inner surfaces are spaced to form a first perimeter recess;
    a driven pulley including:
      a third inner surface opposite a third outer surface;
      a fourth inner surface opposite a fourth outer surface, the fourth inner surface facing the third inner surface, wherein the third and fourth inner surfaces are spaced to form a second perimeter recess; and
    a belt received within the first and second perimeter recesses to connect the drive pulley to the driven pulley, wherein at least one of the opposing inner surfaces has a first center and includes a first groove extending into said at least one opposing inner surface and continuously extending about a second center offset from the first center, at least one edge of the first groove located so as to engage the belt.

11. The belt drive system of claim 10 wherein the first groove extends into the first inner surface.

12. The belt drive system of claim 11 including a second groove extending into the second inner surface and extending about a third center offset from the first center, at least one edge of the second groove located so as to engage the belt.

13. The belt drive system of claim 11 including a second groove extending into the third inner surface, at least one edge of the second groove located so as to engage the belt.

14. The belt drive system of claim 10 wherein the first groove extends into the third inner surface.

15. The belt drive system of claim 14 including a second groove extending into the fourth inner surface, at least one edge of the second groove being located so as to engage the belt.

16. A pulley for use with a belt, the pulley comprising:
a first surface;
a second surface facing the first surface, wherein the first and second surfaces are spaced to receive the belt; and
a continuous groove extending in one of the first and second surfaces, wherein said one of the first and second surfaces has a first center about which the pulley rotates and wherein the groove has a second center offset from the first center.

17. The belt drive assembly of claim 16 wherein said one of the first and second surfaces has an outer periphery and wherein the groove extends substantially from the first center to the outer periphery.

18. In a machine including a belt and belt drive assembly, the machine comprising:
a pulley having an axis of rotation and including at least one groove edge continuously extending about a center offset from the axis of rotation and adapted to engage the belt, thereby increasing the coefficient of friction between the pulley and the belt.

* * * * *